United States Patent Office 3,726,693
Patented Apr. 10, 1973

3,726,693
DEHYDRATED FOOD COATED WITH EDIBLE OIL, GELATIN, GLYCERINE AQUEOUS EMULSION
Norman E. Harris, Waltham, Mass., assignor to the United States of America as represented by the Secretary of the Army
No Drawing. Filed Dec. 22, 1970, Ser. No. 100,772
Int. Cl. A23b; B65b 23/00
U.S. Cl. 99—199                         6 Claims

ABSTRACT OF THE DISCLOSURE

Hardening of coated food items, such as dehydrated and compressed foods coated with an aqueous emulsion of edible oil, caseinate, glycerine and gelatin, which occurs upon exposure to temperatures above 85° F. is eliminated when the moisture level of the coated food items is held below 2% by weight.

BACKGROUND OF THE INVENTION

This invention relates to coated dehydrated foods and, more particularly, to coated, dehydrated foods which do not become hard upon exposure to elevated temperatures.

With the advent of the space age and successful ventures by man into space, there has been presented to those concerned with food technology the challenge of providing the space traveler with an adequate supply of food to sustain life in this new and hostile environment. Supplies of food which are to be carried in space must be lightweight and should be storage stable, ready-to-eat, and resemble normal or accepted dietary items. These requirements are most nearly satisfied by dehydrated foods, i.e. foods whose moisture content has been reduced to a level at which enzymatic or microbial deterioration does not occur. Space feeding in a zero gravity environment, however, presents certain unsual problems in that any particles of food or droplets of liquid released in the space vehicle during weightlessness will remain suspended in space and constitute a potential hazard to the occupants or to sensitive equipment within the craft. With dehydrated foods, the problem of crumbling or fragmentation is most apparent because of the dry and somewhat brittle nature of the product. To eliminate the problem of crumbling associated with dehydrated foods, the prior art has applied coating of one kind or another to the exterior surfaces thereof so as to bind together the surface particles or to provide a covering which will enclose the loose particles and fragments. Such coatings should be edible, not susceptible to microbial or enzymatic degradation, be easily applied, not interfere with rehydration, and not significantly after the organoleptic properties of the food. None of the prior art coatings, however, have met all of the foregoing requirements. The gelatin coating described in U.S. Pat. No. 3,341,336, as an example, becomes quite brittle when dehydrated and imparts an unpleasant feel in the mouth when consumed. Still other coatings require the use of organic solvents or must be applied at melt temperatures, both techniques posing special handling problems. There are edible coatings which can be applied as aqueous emulsions and have the above enumerated desired properties or qualities. These coatings, consisting of a mixture of edible oil, and protein in water, however, have one severe drawback as do all water based coatings. Following drying and upon storage, the coated material becomes extremely hard, so much so that the food product becomes virtually inedible. The cause of this hardening is not completely understood, but in confectionary products it is thought to be possibly due to sucrose-fat crystal growth or to the migration of water containing solutes that bind or cement the ingredients together. Attempts to reduce hardening by use of standard anti-caking agents such as colloidal silicon dioxide or tricalcium phosphate have been completely unsuccessful, as have been the use of high maltose corn syrups which are supposed to control crystallization and reduce subsequent graining (hardening). This hardening phenomenom is time-temperature dependent and will significantly limit the edibility of the food products when stored or exposed to temperatures above 85° F. The present invention provides a method of eliminating the problem of hardening which does not otherwise affect the acceptability of the food products so treated.

SUMMARY

This invention resides in the discovery that the hardening phenomenon observed in dehydrated foods coated with an aqueous-oil-protein emulsion upon exposure to elevated temperatures can be eliminated if the coated food product is dehydrated to and held at a moisture level below 2% by weight. Above this moisture level, hardening will occur upon exposure to temperature above 85° F. While dehydrated foods are normally dried to a moisture level of less than 5% to prevent spoilage or non-enzymatic browning and when long term stability is a requirement to moisture levels of less than 3%, moisture levels of 2% or less were not sought or even desired since the added effort to lower the moisture level below 3% is quite significant and produces no known advantage from a storage stability standpoint. It is an object of the present invention to provide a method of forming a stable, coated dehydrated food product which will not harden upon exposure to elevated temperatures of 85° F. or higher. The term stable refers to the ability of the product not to undergo organoleptic changes during storage at ambient temperatures.

DESCRIPTION OF THE PREFERRED EMBODIMENTS

In accordance with the present invention, I have discovered that the structure of various dehydrated food items which are brittle and fragile and tend to crumble or disintegrate can be stabilized or strengthened by means of an edible, nutritious coating, which coating can be easily applied to the food items and will not cause any increase in toughness or hardness of the food item provided that the moisture level of the food item is maintained below a critical level. The preferred coating on certain confectionary and farinaceous food products is an aqueous emulsion containing edible oil, sodium caseinate, glycerine and gelatin. Other emulsion coatings may be employed in accordance with the practice of this invention provided that the critical moisture level is maintained.

As has already been observed, dehydration of food materials to relatively low moisture levels, i.e. less than 5%, characteristically produce a product that is brittle and prone to crumble or disintegrate. Lyophilization, i.e. drying of frozen material under high vacuum, is the preferred dehydration technique since it most nearly preserves the original structure, original flavors and nutritive value of the processed food item; but this preservation of the original, sometimes delicate, structure, accentuates the fragility of the end item. Certain prepared foods, e.g., sandwiches, toast, cakes, etc., have not been considered to be suitable for dehydration since the resulting structure is so fragile that the product can be easily reduced to a powder. In addition, food blocks or cubes compressed from powdery or granular food materials and having a low moisture content are also prone to crumble or shatter. These and other dried products can be stabilized as to structure in accordance with this invention with a coating in such a manner as to preclude subsequent hardening of the product.

The process of this invention will be described in detail in the following examples:

Example I

A suitable coating to stabilize the structure of low moisture or dried compressed food products is formulated as follows:

| | Percent by wt. |
|---|---|
| Edible vegetable oil (400 hr. A.O.M. stability) | 9.7 |
| Sodium caseinate | 9.7 |
| Glycerine | 2.8 |
| Gelatin (275 bloom) | 2.2 |
| Water | 75.6 |

The coating emulsion is prepared by adding ½ of the sodium caseinate to the oil which has been heated to a temperature within the range of 150°–160° F. The remainder of the caseinate is added to the oil and mixed until all the dry particles are coated with oil. The gelatin is soaked in cold water and allowed to swell and is thereafter heated to 140°–150° F. Glycerine is added to the heated gelatin solution and mixed. About ⅓ of the gelatin-glycerine water solution is added to the oil-sodium caseinate mixture and blended and the remainder of the solution is added and blended at moderate high speed. Entrapped air is removed by heating the mixture in a water bath to a temperature of 190° F. and slowly stirring for 5 minutes. The coating emulsion is maintained at a temperature of from 160°–180° F. for coating application. The emulsion is stable for several months if held at a temperature of 40° F.

Example II

A cocoa flavored coating which may be used in this invention is formulated as follows:

| | Percent by wt. |
|---|---|
| Edible vegetable oil (400 hr. A.O.M. stability) | 35.0 |
| Sodium caseinate | 12.0 |
| Glycerine | 7.0 |
| Gelatin (275 bloom) | 6.0 |
| Sucrose | 33.7 |
| Cocoa | 5.5 |
| Vanilla | 0.5 |
| Citric acid | 0.1 |
| Parabens (3 parts methyl and 1 part propyl) | 0.1 |
| Potassium sorbate | 0.1 |
| Water, 65 ml./100 gram of coating formula. | |

The cocoa coating is prepared by heating the oil to 150° F. and mixing the heated oil with sodium caseinate, sucrose and cocoa. The gelatin is allowed to swell in cold water and then heated to 150° F. Glycerine, vanilla, parabens and potassium sorbate are added to the oil slurry and mixed until a stable emulsion forms. The citric acid in 1 ml. of water is added to the emulsion and mixed and a vacuum is drawn on the coating emulsion to eliminate any entrapped air. The emulsion is heated to and maintained at a temperature of 160°–180° F. for coating application.

Example III

This example describes the preparation of a compressed, dehydrated, imitation ice cream mix cube. An ice cream mix base formulated as follows:

| | Percent by wt. |
|---|---|
| Coconut oil | 12 |
| Non-fat dry milk | 11.2 |
| Sugar | 15.0 |
| Gelatin (275 bloom) | 0.3 |
| Emulsifier | 0.2 |
| Water | 61.3 | was prepared by mixing all the ingredients thoroughly, heating to 165° F. for 30 minutes, homogenizing at 2000 p.s.i. in the first stage and 500 p.s.i. in the second stage and cooling to 40° F. A vanilla flavored mix is prepared by mixing 7.0 grams of ethyl vanillin to 24 lbs. of cooled base mix. The flavored mix is blast frozen and then freeze dehydrated at a maximum pressure of 1.5 mm. of mercury and a maximum temperature of the dry product of 120° F. The resulting dried product is ground to yield a uniform free flowing powder. The powder is then compressed into ¾ inch cubes weighing 5 grams and coated with the emulsion coating of Example I. The cubes are dipped into the heated (160–180° F.) emulsion, drained, frozen and freeze dehydrated in the manner described for the flavored mix until the moisture content was 1.52%. Similar coated cubes were dehydrated to 2.55% moisture. Cubes were then packaged, six to a package, under 29 inches vacuum in heat sealed 1 mil Mylar/2 mil polyethylene laminate flexible pouches. The high moisture and low moisture cubes were packaged separately. The packaged samples were subjected to a temperature of 140° F. for 3 hours to determine storage stability. The cubes having a moisture content of 2.55% upon examination were found to have hardened significantly—so hard in fact that they were difficult to bite or chew without extreme jaw pressure. The low moisture cubes (1.52%) were found not to have changed in quality and did not undergo any hardening as compared with a non-coated control.

Example IV

Compressed cereal bars prepared in accordance with Military Specification MIL–C–3483B, entitled "Cereal, Premixed, Compressed," and consisting principally of corn flakes and puffed rice (class 8 of the specification) were cut into cubes approximately ¾ inch in size. The cubes are dipped into the coating material of Example II which is heated to a temperature of 170° F. in a water bath. The coated cubes are freeze dried as in Example III with some of the cubes being dried to a moisture level of 2.5% and others being dried to a moisture level of 1.5%. The cubes are packaged in cans which are flushed with nitrogen to reduce the oxygen content of the headspace gas to not more than 2% and then sealed. The canned samples were stored for 3 months at 85° F. At the end of this time, the 2.5% moisture cubes had hardened significantly during storage and were practically inedible because of the rock hard quality of the cubes. The low moisture (1.5%) were found to be virtually unchanged and did not harden as did the higher moisture cubes.

Example V

Toasted bread cubes are prepared by toasting ¾ inch thick slices of white bread, e.g., a straight dough bread made from hard wheat flour without shortening. After toasting, the bread slice is brushed with a warm spread and then chilled until the spread congeals. The toast is then cut into ¾ inch cubes and dipped in the coating of Example I and freeze dried. Samples were prepared having moisture levels of 3.0%, 2.25%, 1.9% and 1.5%. The samples were packaged in a flexible laminate pouch under a vacuum of 30 inches. The samples were subjected to a temperature of 150° F. for 4 hours to determine storage stability. The samples having 1.9% and 1.5% moisture levels were unchanged in quality and did not harden during storage and compared in hardness with non-coated controls. The samples having moisture levels of 2.25% and 3.0% had hardened significantly during storage.

The foregoing examples are merely illustrative of specific food items and coatings which are advantageously treated according to the present invention. It is obvious that other food items and particularly any food item which would benefit from an aqueous emulsion coating may be used. While many aqueous, oil-protein emulsion coatings may be used herein, preferred coating compositions have been set forth. Prevention of hardening of the coated food product is prevented provided that the moisture level of the aqueous emulsion coated product is reduced to a moisture level less than 2% by weight and maintained at that level during storage by packaging in a container which will protect the contents from the water vapor in the atmosphere.

I claim:

1. A method of coating a dehydrated food product to stabilize the structure of said product, which coating does not increase in hardness upon exposure to temperatures above 85° F., which method comprises (a) applying an edible, aqueous emulsion consisting of edible oil, caseinate, gelatin, glycerine and water to the exterior of a dehydrated product, (b) drying the coated food product to a moisture content of less than 2% by weight, and (c) sealing said dried coated food product having a moisture content of less than 2% by weight in a container in the absence of oxygen, which container will maintain the moisture content of the product below 2% by weight.

2. A method according to claim 1 wherein said coated food product is freeze-dried.

3. A method according to claim 2 wherein said low moisture product is packed in a container under vacuum.

4. A method according to claim 3 wherein said food product is a mechanically compressed granular material.

5. A method according to claim 3 wherein said food product is shaped in bite size pieces.

6. A method according to claim 1 wherein said food coating is formulated as follows:

| | Percent by wt. |
|---|---|
| Edible oil | 9.7 |
| Sodium caseinate | 9.7 |
| Glycerine | 2.8 |
| Gelatin | 2.2 |
| Water | 75.6 |

References Cited

UNITED STATES PATENTS

| | | | |
|---|---|---|---|
| 3,427,951 | 2/1969 | Mitan et al. | 99—166 |
| 3,341,336 | 9/1967 | Jokay | 99—199 |
| 3,323,922 | 6/1967 | Durst | 99—166 |
| 3,408,210 | 10/1968 | Heyman | 99—199 |
| 3,269,025 | 8/1966 | Dryden | 99—199 |
| 3,434,843 | 3/1969 | Durst | 99—169 |
| 3,556,814 | 1/1971 | Whitman | 99—169 |

NORMAN YUDKOFF, Primary Examiner

U.S. Cl. X.R.

99—166, 182